US006061611A

United States Patent [19]
Whitmore

[11] Patent Number: 6,061,611
[45] Date of Patent: May 9, 2000

[54] CLOSED-FORM INTEGRATOR FOR THE QUATERNION (EULER ANGLE) KINEMATICS EQUATIONS

[75] Inventor: Stephen A. Whitmore, Lake Hughes, Calif.

[73] Assignee: The United States of America as represented by the Administrator of the National Aeronautics and Space Administration, Washington, D.C.

[21] Appl. No.: 09/002,871

[22] Filed: Jan. 6, 1998

[51] Int. Cl.[7] .............................. B64C 15/00; G06F 7/70
[52] U.S. Cl. .................................. 701/4; 701/38; 434/51; 244/184; 244/50 R; 244/194
[58] Field of Search .......................... 701/4, 38; 434/51; 244/184, 194, 90 R

[56] References Cited

U.S. PATENT DOCUMENTS

| | | | |
|---|---|---|---|
| 4,964,599 | 10/1990 | Farineau | 244/195 |
| 5,406,489 | 4/1995 | Timothy et al. | 701/4 |
| 5,799,901 | 9/1998 | Osder | 244/17.13 |
| 5,850,615 | 12/1998 | Osder | 701/4 |
| 5,886,257 | 3/1999 | Gustafson et al. | 73/178 R |
| 5,918,832 | 7/1999 | Zerweckh | 244/48 |

*Primary Examiner*—William A. Cuchlinski, Jr.
*Assistant Examiner*—Olga Hernandez
*Attorney, Agent, or Firm*—John H. Kusmiss

[57] ABSTRACT

The invention is embodied in a method of integrating kinematics equations for updating a set of vehicle attitude angles of a vehicle using 3-dimensional angular velocities of the vehicle, which includes computing an integrating factor matrix from quantities corresponding to the 3-dimensional angular velocities, computing a total integrated angular rate from the quantities corresponding to a 3-dimensional angular velocities, computing a state transition matrix as a sum of (a) a first complementary function of the total integrated angular rate and (b) the integrating factor matrix multiplied by a second complementary function of the total integrated angular rate, and updating the set of vehicle attitude angles using the state transition matrix. Preferably, the method further includes computing a quanternion vector from the quantities corresponding to the 3-dimensional angular velocities, in which case the updating of the set of vehicle attitude angles using the state transition matrix is carried out by (a) updating the quanternion vector by multiplying the quanternion vector by the state transition matrix to produce an updated quanternion vector and (b) computing an updated set of vehicle attitude angles from the updated quanternion vector. The first and second trigonometric functions are complementary, such as a sine and a cosine. The quantities corresponding to the 3-dimensional angular velocities include respective averages of the 3-dimensional angular velocities over plural time frames. The updating of the quanternion vector preserves the norm of the vector, whereby the updated set of vehicle attitude angles are virtually error-free.

21 Claims, 9 Drawing Sheets

CLOSED-FORM INTEGRATOR FOR THE QUATERNION (EULER ANGLE) KINEMATICS EQUATIONS

ORIGIN OF INVENTION

The invention described herein was made in the performance of work under a NASA contract, and is subject to the provisions of Public Law 96-517 (35 U.S.C. 202) in which the Contractor has elected to not retain title.

BACKGROUND OF THE INVENTION

1. Field of the Invention

The present invention relates in general to inertial navigation systems (INS), and more particularly to a kinematics equations integrator device and method for obtaining the attitude of a vehicle from the closed-form integration of kinematics equations utilizing a four-dimensional operator such that the magnitude of said four-dimensional operator is always equal to unity.

2. Background Art

Inertial navigation systems (INS) are widely used in several flight vehicle applications such as aircraft, missiles, spacecraft and satellites. These self-contained navigation systems determine the attitude or position of the flight vehicle relative to some reference coordinate frame. The INS works by integrating the angular velocity or rates of acceleration, measured by onboard sensors, to obtain position with respect to a body-centered coordinate frame.

In order to determine the attitude of vehicle relative to Earth-centered coordinates, the body axes are transformed into a Earth-axes coordinate frame by using the Euler angles. The Euler angles are angles through which one coordinate frame must be rotated to bring its axes to coincidence with another coordinate frame. Euler angles describe the body axes coordinates, namely longitudinal (roll), lateral (pitch) and normal (yaw) axes, with respect to Earth axes coordinates, or the local tangent plane of the Earth and true north, namely north, east and down axes. FIG. 1 illustrates the body axes and the Earth axes coordinate systems.

The direction cosine matrix that allows the transformation from Earth axes to body axes is the product of three successive rotations about the pitch, roll and yaw axes. The transformation is given by the equation:

$$V_{body} = M[\theta, \phi, \psi] V_{Earth} \quad (1)$$

where $M(\theta, \phi, \psi)$ is the direction cosine matrix, $$M(\theta, \phi, \psi) = \{m_{ij}\} \quad (2)$$

$$= \begin{bmatrix} (\cos\theta\cos\psi) & (\cos\theta\sin\psi) & -(\sin\theta) \\ \begin{pmatrix} \sin\Phi\sin\theta\cos\psi - \\ \cos\Phi\sin\psi \end{pmatrix} & \begin{pmatrix} \sin\Phi\sin\theta\sin\psi + \\ \cos\Phi\cos\psi \end{pmatrix} & (\sin\Phi\cos\theta) \\ \begin{pmatrix} \cos\Phi\sin\theta\cos\psi + \\ \sin\Phi\sin\psi \end{pmatrix} & \begin{pmatrix} \cos\Phi\sin\theta\sin\psi - \\ \sin\Phi\cos\psi \end{pmatrix} & (\cos\Phi\cos\theta) \end{bmatrix}$$

Here, $\theta$ is the pitch angle, $\phi$ is the roll or bank angle, and $\psi$ is the yaw or heading angle.

The onboard sensors used to measure the angular velocity about the pitch, roll and yaw axes are usually accelerometers and gyroscopes. For most INS applications, these sensors are mounted on the vehicle in one of two ways: the platform INS or the strap-down INS. The platform INS maintains the sensors in the same attitude relative to the surroundings. This is achieved by placing the sensors in a gimbal housings. Depending on the application several gimbal housings may be required.

The strap-down INS fixes the sensors on each of the three body axes and does not require gimbal housings. As a result, the strap-down INS has lower weight, lower power consumption and higher accuracy than the platform INS. Consequently, in most modern applications the strap-down INS is preferred. Because, however, of the need to calculate coordinate transformations, the strap-down INS places maximum burden on the computational system. Thus, high-speed processors, significant amounts of computer memory and complex software generally are required for the strap-down INS.

One recurring problem of both types of INS is that they are neutrally stable systems and any bias or systematic errors in the angular velocity measurements remain and are not damped out. This causes the INS to drift, meaning that the error increases with time. One solution is to use the platform INS and stabilize the sensors in gimbal housings. The problem is this arrangement is subject to a physical locking up of the gimbal when the pitch angle of the vehicle is vertical, or 90 degrees. This "gimbal lock," as it is known in the art, is particularly problematic for missiles, spacecraft and other flight vehicles that often assume a pitch angle of 90 degrees for extended periods of time. Thus, platform INS is rarely used in modem applications.

Strap-down INS is not subject to a physical "gimbal lock" like the platform INS. However, there are other problems with the strap-down INS. First, because the kinematics equations have a division by zero when the pitch angle is 90 degrees, the strap-down INS is subject to a mathematical "gimbal lock." For example, the measured angular velocity vector (p, q, r) in body axes, where p is the roll rate, q is the pitch rate, and r is the yaw rate, is expressed in Earth axes by the following kinematics equations:

$$\begin{bmatrix} \dot\phi \\ \dot\theta \\ \dot\psi \end{bmatrix} = \frac{1}{\cos\theta} \begin{bmatrix} \cos\theta & (\sin\phi\sin\theta) & \cos\phi\sin\theta \\ 0 & \cos\phi\cos\theta & -\sin\phi\cos\theta \\ 0 & \sin\phi & \cos\phi \end{bmatrix} \begin{bmatrix} p \\ q \\ r \end{bmatrix} \quad (3)$$

In equation 3, the $1/\cos\theta$ term has a singularity when the pitch angle $\theta$ passes through $\pm\pi/2$, in other words when the pitch angle is vertical. This singularity makes equation 3 difficult to integrate to obtain the attitude of the vehicle.

Second, in addition to the singularity problem, there is computational difficulty in trying to obtain the Euler angles from the integration of equation 3. In general, no closed-form solution for equation 3 exist and it must be numerically integrated. However, equation 3 is highly non-linear, and the sine and cosine terms must be evaluated as Taylor series expansions. For example, the numerical integration of equation 3 using a fourth-order numerical integration scheme requires that each sine and cosine term be evaluated four different times at each time step. These computations require a great deal of computational expense and time.

The prior art avoids these foregoing problems in integrating equation 3 by formulating the kinematics equations in terms of quaternion parameters. In general, a quaternion is a four-element vector with one real and three imaginary components. The quaternion provides a four-parameter operation of coordinate transformation that is a more efficient representation for rotation than the three-dimensional orthonormal matrix with nine parameters and six orthonormal constraints. The quaternion formulation transforms t hree quantities into four quantities with only one constraint. This four-space vector and constraint can be written as:

$$\lambda \equiv ia + jb + kc + d \Rightarrow \begin{bmatrix} a \\ b \\ c \\ d \end{bmatrix} = \begin{bmatrix} \sin\delta/2 \begin{bmatrix} u_x \\ u_y \\ u_z \end{bmatrix} \\ \cos\delta/2 \end{bmatrix} \quad (4)$$

$$\Downarrow$$

$$\|q\|^2 = a^2 + b^2 + c^2 + d^2 = 1$$

Where, $u_x$, $u_y$, $u_z$, are the components of the unit vectors pointing along the body axis of the vehicle, and the one constraint is that the norm of the quaternion be equal to unity.

The quaternion formulation transforms the three-dimensional attitude of pitch, roll and yaw ($\theta$, $\phi$, $\psi$) into a set of quaternion parameters (a,b,c,d) with the single constraint. Instead of the usual three rotations, using quaternions accomplishes the coordinate transformation from Earth axes to body axes in a single rotation.

The quaternions are defined in terms of the direction cosine matrix of equation 2 as:

$$\begin{bmatrix} a \\ b \\ c \\ d \end{bmatrix} = \begin{bmatrix} \dfrac{m_{23} - m_{32}}{4d} \\ \dfrac{m_{31} - m_{13}}{4a} \\ \dfrac{m_{12} - m_{21}}{4d} \\ \dfrac{1}{2}\sqrt{1 + m_{11} + m_{22} + m_{33}} \end{bmatrix} \quad (5)$$

with, $$\sin\theta = -m_{13} = 2(bd - ac) \quad (6)$$

$$\tan\psi = \dfrac{m_{12}}{m_{11}} = \dfrac{2(ab + cd)}{2(a^2 + d^2) - 1}$$

$$\tan\phi = \dfrac{m_{23}}{m_{33}} = \dfrac{2(bc + ad)}{2(c^2 + d^2) - 1}$$

and the direction cosine matrix, equation 2, reduces to:

$$M(\theta, \phi, \psi) = \begin{bmatrix} a^2 + d^2 - b^2 - c^2 & 2(ab + cd) & 2(ac - bd) \\ 2(ab - cd) & b^2 + d^2 - a^2 - c^2 & 2(bc + ad) \\ 2(ac + bd) & 2(bc - ad) & c^2 + d^2 - a^2 - b^2 \end{bmatrix} \quad (7)$$

$$\equiv M(a, b, c, d)$$

In geometric terms, the quaternion formulation maps the kinematic equations of three-dimensional space onto the surface of a unit hypersphere in four-dimensional space, with the constraint that the radius of the hypersphere is equal to unity. The result is that non-linear sine and cosine terms as well as the singularity of equation 3 disappear. The 3-D kinematics equations of equation 3 become in terms of a 4-D quaternion formulation:

$$\begin{bmatrix} \dot{a} \\ \dot{b} \\ \dot{c} \\ \dot{d} \end{bmatrix} = \dfrac{1}{2} \begin{bmatrix} 0 & r & -q & p \\ -r & 0 & p & q \\ q & -p & 0 & r \\ -p & -q & -r & 0 \end{bmatrix} \begin{bmatrix} a \\ b \\ c \\ d \end{bmatrix} = \quad (8)$$

Equation 8 can be written in vector form as:

$$\dot{\lambda}(t) = \omega(p,q,r) \lambda(t) \quad (9)$$

Equation 9 looks like a linear, time-varying system common in dynamics. However, integration of equation 9 is actually quite difficult because of the unique properties of quaternions. Quaternion parameters are on the surface of a unit hypersphere in four-dimensional space. All operations, therefore, must be rotational and must take place on the surface of the unit hypersphere. This non-Euclidean quaternions space doe., not follow the rules of vector algebra. Essentially, normal linear Euclidean operations of addition and subtraction do not exist in quaternion space.

Traditional approaches of the prior art in solving the quaternion kinematics equations of equation 9 have been to use numerical integration schemes such as Runge-Kutta and Adams-Bashforth. These methods, however, violate the mathematics of the quaternion space. Nevertheless, the prior art continues to use these and a number of other numerical integration schemes to integrate the quaternion kinematics equations.

All of these numerical integration schemes require the approximation of integrals by summation. But because addition does not exist in the quaternion space, the single constraint that a+b+c+d=1 (i.e., normalization of the quaternion) is not guaranteed. Geometrically, this occurs because addition is not a rotational operation, and the summation performed by the integration scheme does not take place on the surface of tie unit hypersphere. Therefore, the integration scheme must renormalize the quaternions after each time step to ensure the quaternion norm is equal to unity.

The problem with renormalization after each time step is that it introduces error into the integration in the form of analytical drift. Left unchecked, this drift accumulates over time and eventually leads to divergence of the integration and instability. The prior art integration schemes manage this drift through a variety of ad hoc methods. Usually these ad hoc methods involve trading error between the axes by adding or subtracting correction terms at each time step in order to artificially preserve quaternion normality.

The primary disadvantage of the prior art integration schemes is that none actually preserve quaternion normality. In fact, the best that these method can do is to correct the drift in quaternion normalization after it has occurred. This renormalization procedure, however, is an artificial operation that violates the mathematics of the quaternion space, and therefore always introduces additional errors into the integration. Furthermore, the need to renormalize the quaternions after every time step greatly reduces the integration speed.

Another disadvantage to existing numerical integration schemes is that most of them are proprietary. Each method is designed for a specific computational system based on the noise of the integration, noise of the system and how many bits contained in the processor. This means an integration scheme designed for a specific computational system may not work on another computational system, thereby reducing the portability of the integration scheme.

Still another disadvantage to prior art integration schemes is that powerful and expensive computational systems are needed to implement them. This is because the error from the normalization drift must be corrected by performing several operations on various terms in the equation after each time step. This need for additional computational capability can add a great deal of weight to the INS and to the vehicle.

Another disadvantage of the prior art schemes is that the lines of source code and the complexity of the software required to implement these integration methods are generally quite large. The memory, therefore, required to store this software is substantial. In addition, the cost of code maintainability is high because of the length and complexity of the source code. Moreover, if transportation of the code between computational systems requires the code to be in a different language the cost of rewriting the code in another language can be high.

Therefore, what is needed is a kinematics equations integrator device and method that preserves the quaternion normalization. This closed form integrator device and method would obey the mathematical properties of the quaternion space and therefore would not require correction terms or renormalization ever. Moreover, because the need for renormalization and correction terms would not exist, this integrator device and method would greatly increase the integration speed, decrease the amount and complexity of the software required, and require only basic computational systems on which to operate. Further, the integrator device and method would be portable between-various computational systems.

Whatever the merits of the above mentioned systems and methods, they do not achieve the benefits of the present invention.

SUMMARY OF THE INVENTION

To overcome the limitations in the prior art as described above, and to overcome other limitations that will become apparent after reading and understanding the present specification, the present invention is embodied in a kinematics equations integrator device and method for obtaining the attitude of a vehicle from the closed-form integration of kinematics equations utilizing a four-dimensional operator such that the magnitude of said four-dimensional operator is always equal to unity.

An inertial navigation system (INS) suitable for utilizing the kinematics equations integrator device and method of the present invention includes sensor for supplying angular velocity and initial vehicle attitude data. The kinematics equations device and method receives this data and outputs the updated attitude information of the vehicle, usually in the form of Euler angles. These are received by the navigational processor which determines whether a course correction is required. If so, then the navigational processor instructs the control system to correct the course. Course correction is effected through movement of the actuators and the vehicle control surfaces.

The kinematics equations integrator device of the present invention is capable of receiving data from and supplying updated vehicle attitude information to the INS. One way the integrator device does this is by receiving angular velocity and initial attitude data supplied by the INS. This data is received by an initial computation logic that computes the 3-D kinematics equations and transforms the initial Euler angles into a quaternion vector.

The data from the initial computation logic is then sent to an integration loop logic performs a continuous integration loop. The 3-D kinematics are transformed into 4-D quaternion kinematics equations, an integrating factor is calculated and a state transition matrix for aiding in the solution of the 4-D quaternion kinematics equations is computed. Using the state transition matrix, the updated quaternion is calculated. At all times the norm of the quaternion remains equal to unity.

The data from the integration loop logic is received by a reverse transformation logic that determines whether the navigational processor requires updated Euler angles. If so, then the reverse transformation logic transforms the updated quaternion into the updated Euler angle and sends them to the navigational processor to be used as described above. In addition, the reverse transformation logic determines whether the integration loop needs reinitializing. If so, then the updated Euler angles are sent to the initial computation logic for use in reinitializing the kinematics equations integrator. Meanwhile, the integration loop logic continues its integration loop.

The kinematics equations integrator method of the present invention can be implemented in the integrator device as dedicated logic circuit or a field programmable gate array (FPGA). Alternatively, the integrator device can contain a microprocessor and memory for storing the software coded with the integrator method.

The integrator method is capable of interacting with the INS as part of the kinematics equations integrator device by receiving information from and supplying information to the INS. The INS then uses this information supplied by the kinematics equations integrator device and method to determine whether the vehicle is on course and to effect needed changes.

Similar to the integrator device described above, the kinematics equations integrator method of the present invention is divided into an initial computation function, an integration loop function and a reverse logic function. The initial computation function receives the initial Euler angle and angular velocity data from the INS and constructs 3-D kinematics equations and transforms the initial Euler angles into a quaternion vector.

The integration loop function constructs 4-D quaternion kinematics equations and integrates them while preserving the norm of the quaternion. The updated quaternion is, then sent to the reverse transformation function which send the update Euler angles to the navigational processor if they are requested. The output from the reverse transformation function is used by the navigational processor to determine whether a course correction is needed.

The device and method of the present invention always preserve the norm of the quaternion because the mathematics of the quaternion space is not violated. This critical feature of the present invention allows the integration of the kinematics equations to be faster and more accurate than prior art methods.

In summary, the invention is embodied in a method of integrating kinematics equations for updating a set of vehicle attitude angles of a vehicle using 3-dimensional angular velocities of the vehicle, which includes computing an integrating factor matrix from quantities corresponding to the 3-dimensional angular velocities, computing a total integrated angular rate from the quantities corresponding to 3-dimensional angular velocities, computing a state transition matrix as a sum of (a) a first complementary function of the total integrated angular rate and (b) the integrating factor matrix multiplied by a second complementary function of the total integrated angular rate, and updating the set of vehicle attitude angles using the state transition matrix. Preferably, the method further includes computing a quaternion vector from the quantities corresponding to the 3-dimensional angular velocities, in which case the updating of the set of vehicle attitude angles using the state transition matrix is carried out by (a) updating the quaternion vector by multiplying the quaternion vector by the state transition matrix to produce an updated quaternion vector and (b) computing an updated set of vehicle attitude angles from the updated quaternion vector. The first and second trigonometric functions are complementary, such as a sine and a cosine. The quantities corresponding to the 3-dimensional angular velocities include respective averages of the 3-dimensional angular velocities over plural time frames. The updating of the quaternion vector preserves the norm of the vector, whereby the updated set of vehicle attitude angles are virtually error-free.

BRIEF DESCRIPTION OF THE DRAWINGS

Referring to the drawings in which like reference numbers represent corresponding parts throughout.

DETAILED DESCRIPTION OF THE PREFERRED EMBODIMENT

In the following description of the preferred embodiment, reference is made to the accompanying drawings that form a part hereof, and in which is shown by way of illustration a specific embodiment whereby the invention may be practiced. It is to be understood that other embodiments may be utilized and structural changes may be made without departing from the scope of the present invention.

Structural Overview

Figure 1:
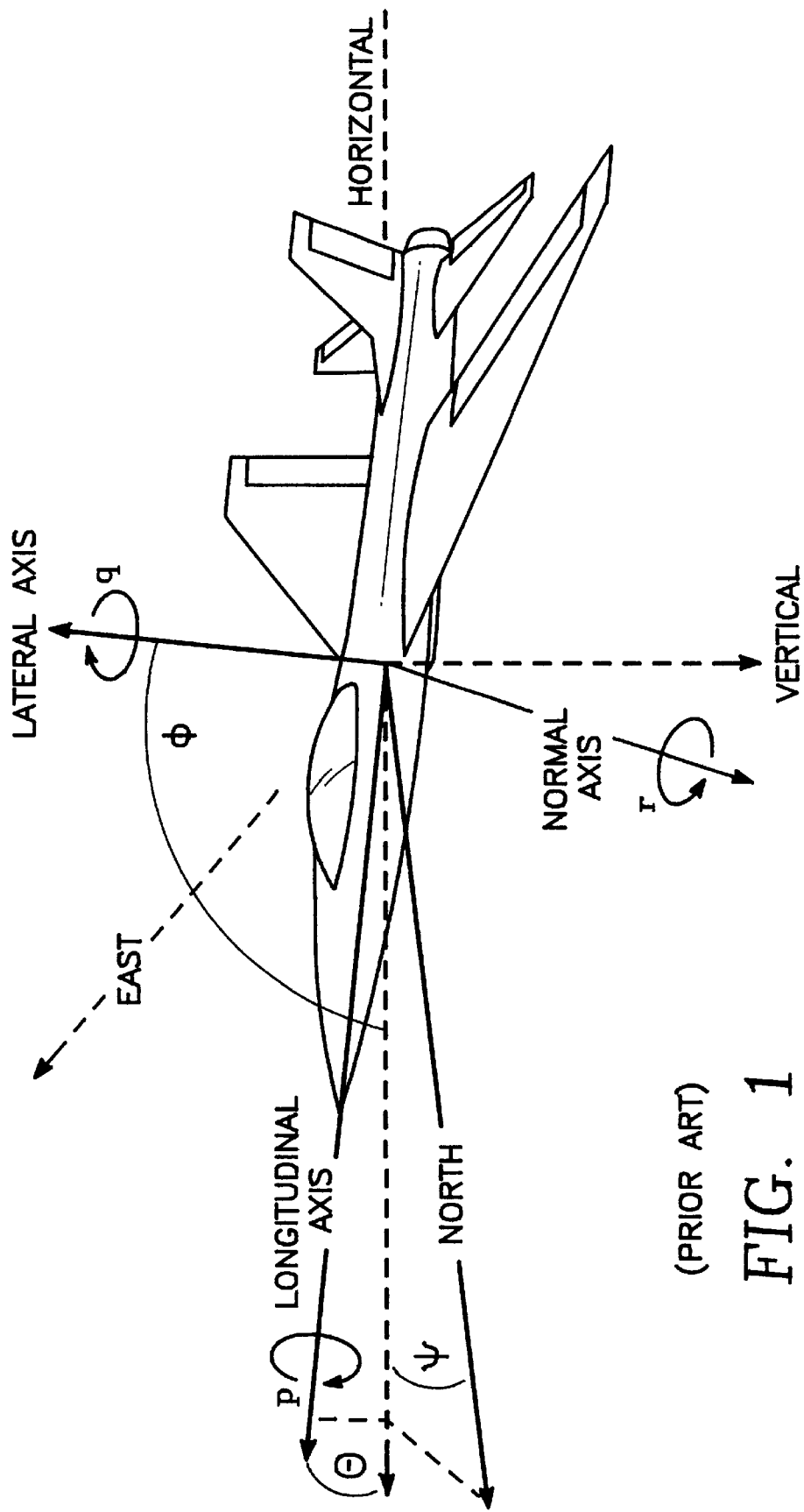
FIG. 1 illustrates the body-axis and Earth-axis coordinate frame definitions and the Euler angles.
Figure 2:
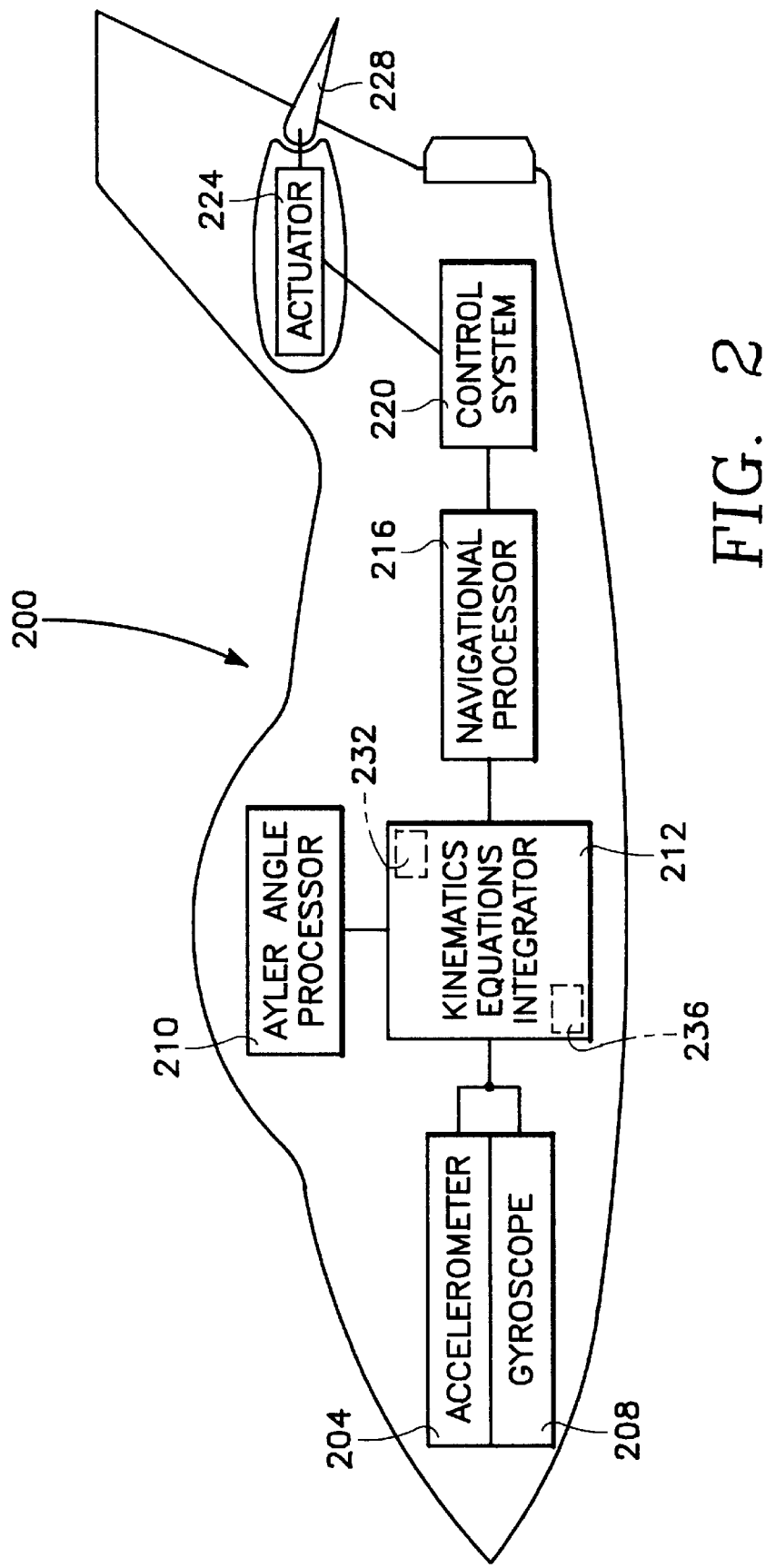
FIG. 2 is an overview of an inertial navigational system suitable for utilizing the device and method of the present invention.

FIG. 2 is an overview of an inertial navigational system 202 suitable for utilizing the device and method of the present invention. The inertial navigational system 202 is carried within the flight vehicle 200. The inertial navigational system 202 includes accelerometers 204 and gyroscopes 208 located on each of the three body axes that measure the angular velocity (p,q,r) on each axis at any instant in time. The Euler angle processor 210 determines the attitude of the vehicle 200 at any given time in terms of the Euler angles (These Euler angles may be entered by the user or preferably determined by an alternative navigational system, such as a regular Global Positioning System (GPS) or carrier-phase GPS.

Both the accelerometers 204, gyroscopes 208 and Euler angle processor 210 are connected to the kinematics equations integrator 212. This device receives the necessary data from the accelerometers 204, gyroscopes 208 and Euler angle processor 210, computes the necessary kinematics equations and integrates them in order to obtain updated vehicle attitude information in the form of the Euler angles. The navigational processor 216, which is linked to the kinematics equations integrator 212, receives data from the kinematics equation integrator 212, processes the supplied attitude data and determines whether the vehicle 200 is following the desired course.

The control system 220 is controls actuators 224 located at various locations on the vehicle 200. If the control system 220 is activated by the navigational processor 216, the control system 220 activates the actuators 224 which in turn move the control surfaces 228. This adjustment of the control surfaces continues until the vehicle 200 is on the desired course.

1. Kinematics Equations Integrator

Figure 3:
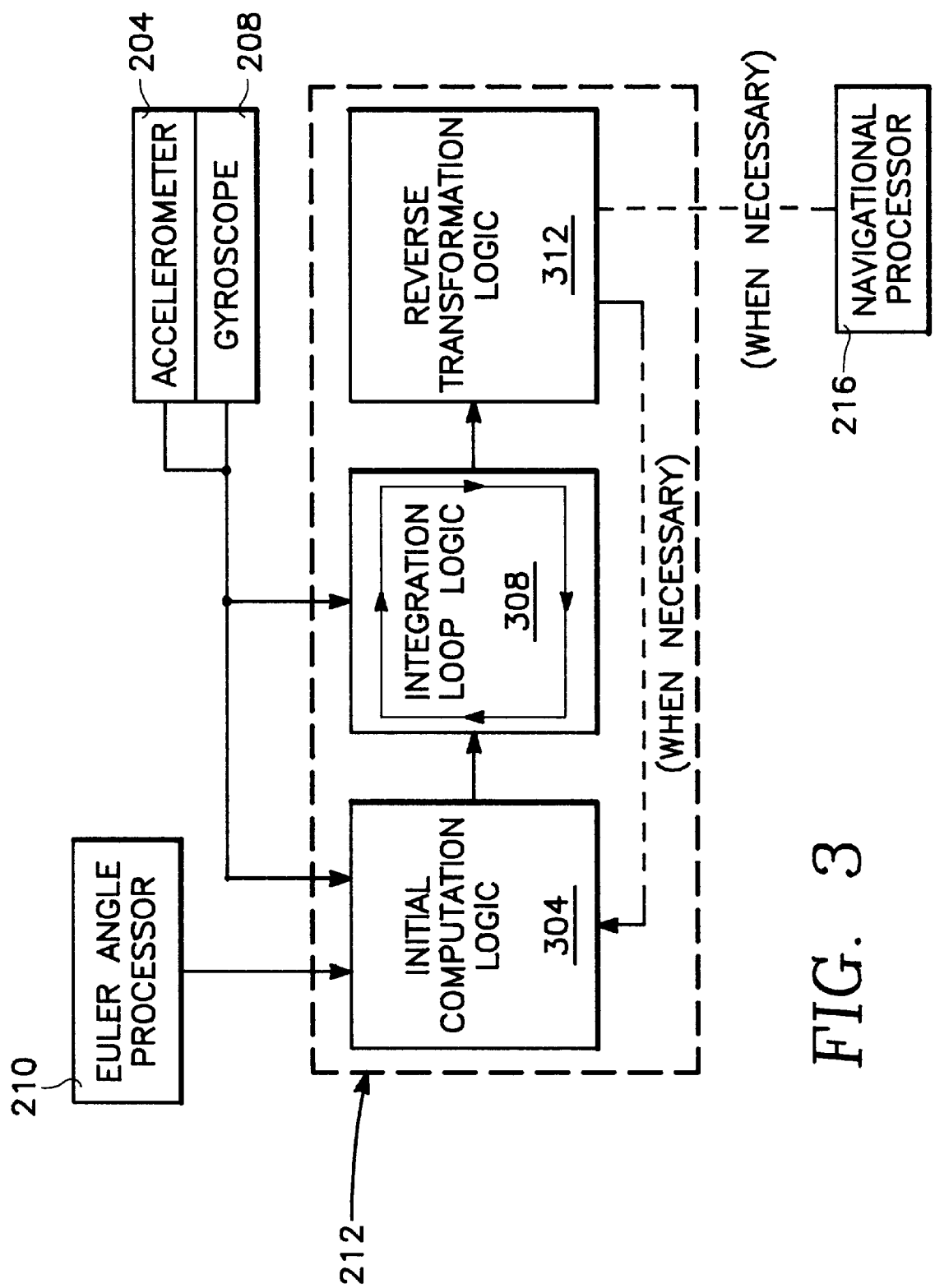
FIG. 3 is an overview structural block diagram of the kinematics equations integrator of the present invention.

FIG. 3 is an overview structural block diagram of the kinematics equations integrator 212 portion of the inertial navigational system 202 of the present invention. This kinematics equations integrator 212 is comprised of an initial computation logic 304, an integration loop logic 308 and a reverse transformation logic 312.

The accelerometers 204 and gyroscopes 208 are connected to the integrator 212 to provide angular velocity data. The Euler angle processor 210 is linked to the integrator 212 to provide attitude information. As shown in FIG. 2 and FIG. 3 the navigational processor 216 is connected to the output of the kinematics equations integrator 212 to process the information produced by the integrator 212. Moreover, as explained further below, the reverse transformation logic 312 is linked to the initial computation logic 304 to provide updated attitude information as required.

The various logic modules of the kinematics equations integrator 212 will now be explained in further detail.

a. Initial Computation Logic

Figure 4:
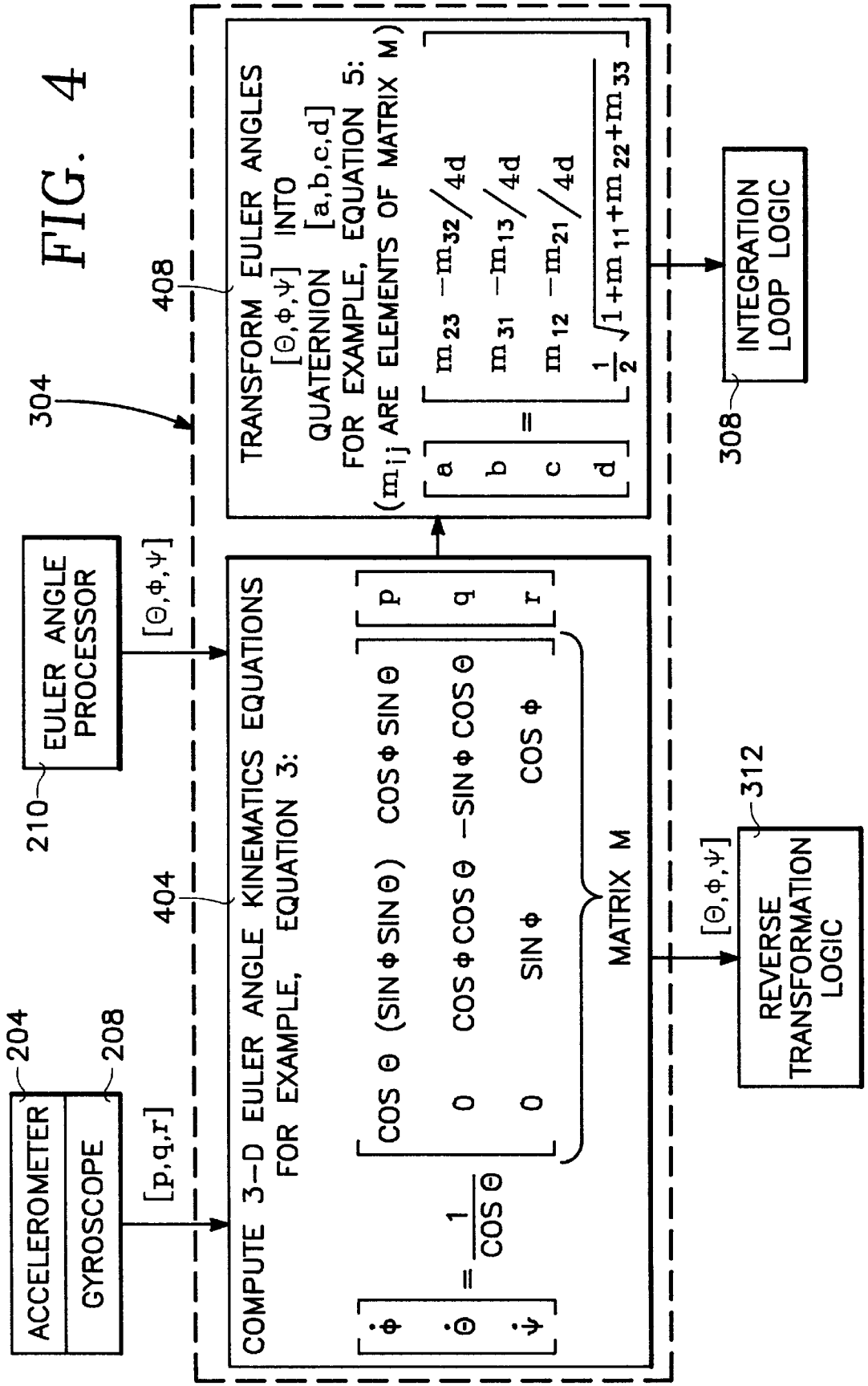
FIG. 4 is a detailed block diagram of the initial computation logic of the kinematics equations integrator of the present invention.

In order to compute the attitude of the vehicle certain initial data is required by the integration loop logic 308. As shown in FIG. 4, this initial data is provided by the initial computation logic 304. In general, the initial computation logic 304 takes the data received from the accelerometers 204, gyroscopes 208 and the Euler angle processor 210 or reverse transformation logic 312 and computes the 3-D kinematics equations and the quaternions.

Specifically, the accelerometers 204 and gyroscopes 208 send the angular velocity vector (p,q,r) data to the initial computation logic 304. In addition, the Euler angle processor 210 determines the initial attitude of the vehicle 200 in terms of Euler angles. In general, the Euler angle information from the Euler angle processor 210 is required at start-up. Updated Euler angle data is supplied to the initial computation logic 304 whenever the navigational system requests update. As stated earlier, this initial or updated Euler angle information may come from the user or an alternative navigational system. The criteria for determining when to update the navigational system is well-known to one skilled in the navigational art, and may involve the amount of accumulated systemic error, the vehicle exceeding a predetermined attitude, or after an elapsed time.

Updated Euler angle data also may be supplied to the initial computation logic 304 by the reverse transformation logic 312. This will be discussed below in connection with the reverse transformation logic 312.

The angular velocity and Euler angle data is supplied to the initial computation logic 304 and used to compute the 3-D Euler angle kinematics equations. The 3-D kinematics equations module 404 computes these equations as given in equation 3:

$$\begin{bmatrix} \dot{\phi} \\ \dot{\theta} \\ \dot{\psi} \end{bmatrix} = \frac{1}{\cos\theta} \begin{bmatrix} \cos\theta & (\sin\phi\sin\theta) & \cos\phi\sin\theta \\ 0 & \cos\phi\cos\theta & -\sin\phi\cos\theta \\ 0 & \sin\phi & \cos\phi \end{bmatrix} \begin{bmatrix} p \\ q \\ r \end{bmatrix} \quad (3)$$

The 3×3 matrix of the equation is defined as the M matrix. In addition, θ is the pitch angle, φ is the roll or bank angle, and ψ is the yaw or heading angle while p is the roll rate, q is the pitch rate and r is the yaw rate.

The elements of the M matrix are sent to the quaternion transformation module 408 and used to calculate the quaternion vector (a,b,c,d). This transformation is given by equation 5:

$$\begin{bmatrix} a \\ b \\ c \\ d \end{bmatrix} = \begin{bmatrix} \frac{m_{23} - m_{32}}{4d} \\ \frac{m_{31} - m_{13}}{4a} \\ \frac{m_{12} - m_{21}}{4d} \\ \frac{1}{2}\sqrt{1 + m_{11} + m_{22} + m_{33}} \end{bmatrix} \quad (5)$$

The quaternion vector (a,b,c,d) and the angular velocity vector (p,q,r) are then sent to the integration loop logic 308.

b. Integration Loop Logic

Figure 5:
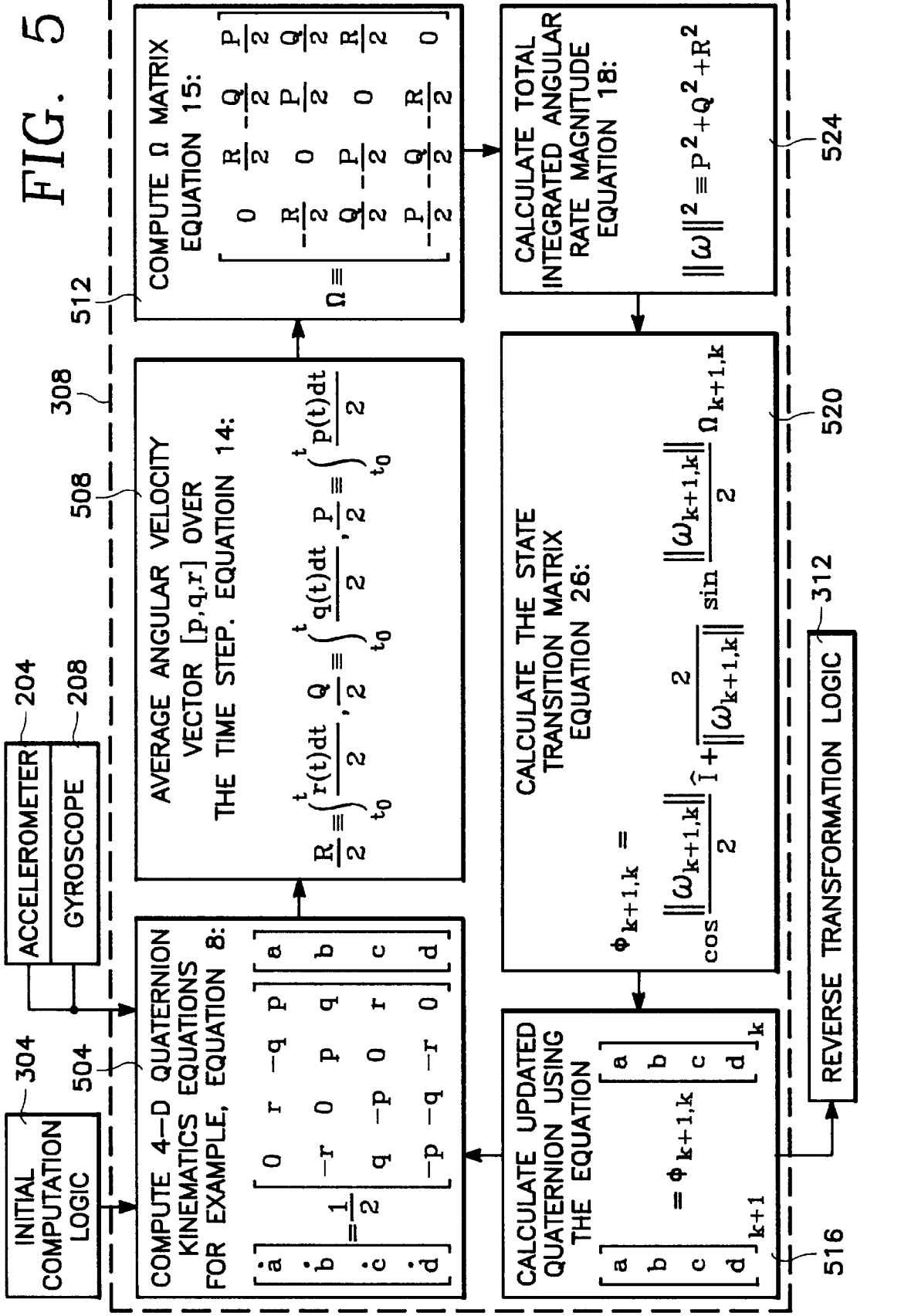
FIG. 5 is a detailed block diagram of the integration loop logic of the kinematics equations integrator of the present invention.

The heart of the kinematics equations integrator 212 is the integration loop logic, 308. As shown in FIG. 5, this logic includes six modules which perform several operations over a small time step to obtain a time-advanced solution to the kinematics equations.

The data from the initial computation logic 304 are sent to the quaternion kinematics equations module 504 of the integration loop logic 308. Depending on whether the navigational system requires initialization, the angular velocity vector may be required from the accelerometers 204 and gyroscopes 208. Thus, if initialization is required, the quaternion kinematics equations module 504 uses both the quaternion vector (a,b,c,d) and the angular velocity vector (p,q,r) from the initial computation logic 304. If initialization is not required, only the quaternion vector is used. The angular velocity vector information is obtained from the accelerometers 204 and gyroscopes 208. The criteria for whether initialization is required is discussed above.

The quaternion kinematics equations module 504 receives the quaternion vector (a,b,c,d) and angular velocity vector (p,q,r) and computes the four-dimensional quaternion kinematics equations. The quaternion kinematics equation for the angular velocity is given by equation 8:

$$\begin{bmatrix} \dot{a} \\ \dot{b} \\ \dot{c} \\ \dot{d} \end{bmatrix} = \frac{1}{2} \begin{bmatrix} 0 & r & -q & p \\ -r & 0 & p & q \\ q & -p & 0 & r \\ -p & -q & -r & 0 \end{bmatrix} \begin{bmatrix} a \\ b \\ c \\ d \end{bmatrix} = \quad (8)$$

which can be expressed in vector form as:

$$\dot{\lambda}(t) = \psi(p,q,r)\,\lambda(t) \quad (9)$$

Rather than use ad hoc numerical integration schemes that do not preserve the norm of the quaternion, as is done in the prior art, a better way of integrating equation 9 is to use the integrating factor:

$$I(t) = \exp\left[\int_{t_0}^{t} -\omega(p,q,r)dt\right] \quad (10)$$

where, $$\omega = \frac{1}{2} \begin{bmatrix} 0 & r & -q & p \\ -r & 0 & p & q \\ q & -p & 0 & r \\ -p & -q & -r & 0 \end{bmatrix} \quad (11)$$

Applying equation 10 to equation 9 yields:

$$\exp\left[\int_{t_0}^{t} -\omega(p,q,r)dt\right]\dot{\lambda}(t) = \exp\left[\int_{t_0}^{t} -\omega(p,q,r)dt\right]\omega(p,q,r)\lambda(t) \quad (12)$$

Equation 12 integrates from some initial time to to time t to give the result:

$$\lambda(t) = \exp\left[\int_{t_0}^{t} \omega(p,q,r)dt\right]\lambda(t_0) \quad (13)$$

$$= \exp\left\{\int_{t_0}^{t} \frac{1}{2} \begin{bmatrix} 0 & r & -q & p \\ -r & 0 & p & q \\ q & -p & 0 & r \\ -p & -q & -r & 0 \end{bmatrix} dt\right\}\lambda(t_0)$$

The averaging module 508, shown in FIG. 5, is an optional module that simply averages the angular velocity components (p,q,r) over some time interval (t−$t_0$). Thus, the components of the time-averaged angular velocity vector (P,Q,R) are defined as:

$$\frac{R}{2} \equiv \int_{t_0}^{t} \frac{r(t)dt}{2},\; \frac{Q}{2} \equiv \int_{t_0}^{t} \frac{q(t)dt}{2},\; \frac{P}{2} \equiv \int_{t_0}^{t} \frac{p(t)dt}{2} \quad (14)$$

Because the averaging module 508 is optional, in all the following equations (P,Q,R) could be replaced with (p,q,r). However, for this discussion the averaging module will be used because the averaging of the angular velocity components avoids a phase change in the calculations.

Using the averaging module 508, equation 13 reduces to:

$$\lambda(t) = \exp\left\{\int_{t_0}^{t} \begin{bmatrix} 0 & \frac{R}{2} & -\frac{Q}{2} & \frac{P}{2} \\ -\frac{R}{2} & 0 & \frac{P}{2} & \frac{Q}{2} \\ \frac{Q}{2} & -\frac{P}{2} & 0 & \frac{R}{2} \\ -\frac{P}{2} & -\frac{Q}{2} & -\frac{R}{2} & 0 \end{bmatrix} dt\right\}\lambda(t_0) \quad (15)$$

$$\equiv \exp[\Omega(p,q,r)]\lambda(t_0)$$

Here, the integrand of equation 15 is known as the Ω matrix, and may be called the integrating factor matrix.

The Ω matrix module 512 receives the time-averaged angular velocity vector (P,Q,R) from the averaging module 508 and computes the Ω matrix.

Expanding the exponential of equation 15 in a McLaurin's series:

$$\exp[\Omega] = I + \frac{\Omega}{1!} + \frac{\Omega^2}{2!} + \frac{\Omega^3}{3!} + \ldots \quad (16)$$

and noting that:

$$\Omega^2 = \begin{bmatrix} 0 & \frac{R}{2} & -\frac{Q}{2} & \frac{P}{2} \\ -\frac{R}{2} & 0 & \frac{P}{2} & \frac{Q}{2} \\ \frac{Q}{2} & -\frac{P}{2} & 0 & \frac{R}{2} \\ -\frac{P}{2} & -\frac{Q}{2} & -\frac{R}{2} & 0 \end{bmatrix} \begin{bmatrix} 0 & \frac{R}{2} & \frac{Q}{2} & \frac{P}{2} \\ \frac{R}{2} & 0 & \frac{P}{2} & \frac{Q}{2} \\ \frac{Q}{2} & \frac{P}{2} & 0 & \frac{R}{2} \\ \frac{P}{2} & \frac{Q}{2} & \frac{R}{2} & 0 \end{bmatrix} \quad (17)$$

$$= \frac{1}{4}\begin{bmatrix} (P^2 + Q^2 + R^2) & 0 & 0 & 0 \\ 0 & (P^2 + Q^2 + R^2) & 0 & 0 \\ 0 & 0 & (P^2 + Q^2 + R^2) & 0 \\ 0 & 0 & 0 & (P^2 + Q^2 + R^2) \end{bmatrix}$$

$$= -\left(\frac{\|\omega\|}{2}\right)^2 I$$

Here, $I$ is the identity matrix, and $\|\omega\|$ is the total integrated angular rate magnitude. This quantity is computed by the total integrated angular rate magnitude (TIARM) module 524 using the equation:

$$\|\omega\|^2 P^2 + Q^2 + R^2 \quad (18)$$

Exploiting the structure provided by equation 17, the McLaurin's series of equation 16 becomes:

$$e^{\Omega} = I + \Omega + \frac{\Omega^2}{2!} + \Omega\frac{\Omega^2}{3!} + \frac{(\Omega^2)^2}{4!} + \frac{\Omega(\Omega^2)^2}{5!} + \quad (19)$$

$$\frac{(\Omega^2)^3}{6!} + \frac{\Omega(\Omega^2)^3}{7!} + \ldots$$

$$= \Omega\left[I + \frac{\Omega^2}{3!} + \frac{(\Omega^2)^2}{5!} + \frac{(\Omega^2)^3}{7!} + \ldots\right] +$$

-continued $$\left[I + \frac{\Omega^2}{2!} + \frac{(\Omega^2)^2}{4!} + \frac{(\Omega^2)^3}{6!} + \ldots\right]$$

$$= \Omega\left[1 + \frac{-\left(\frac{\|\omega\|}{2}\right)^2}{3!} + \frac{\left(-\left(\frac{\|\omega\|}{2}\right)^2\right)^2}{5!} + \frac{\left(-\left(\frac{\|\omega\|}{2}\right)^2\right)^3}{7!} + \ldots\right] +$$

$$I\left[1 + \frac{-\left(\frac{\|\omega\|}{2}\right)^2}{2!} + \frac{\left(-\left(\frac{\|\omega\|}{2}\right)^2\right)^2}{4!} + \frac{\left(-\left(\frac{\|\omega\|}{2}\right)^2\right)^3}{6!} + \ldots\right] + \ldots$$

Expanding equation 19 further:

$$1 + \frac{-\left(\frac{\|\omega\|}{2}\right)^2}{3!} + \frac{\left(-\left(\frac{\|\omega\|}{2}\right)^2\right)^2}{5!} + \frac{\left(-\left(\frac{\|\omega\|}{2}\right)^2\right)^3}{7!} + \ldots = \frac{2}{\|\omega\|}\left[\frac{\|\omega\|}{2} - \frac{\left(\frac{\|\omega\|}{2}\right)^3}{3!} + \frac{\left(\frac{\|\omega\|}{2}\right)^5}{5!} - \frac{\left(\frac{\|\omega\|}{2}\right)^7}{7!} + \ldots\right] \quad (20)$$

$$= \frac{2}{\|\omega\|}\sin\frac{\|\omega\|}{2}$$

and, $$1 + \frac{-\left(\frac{\|\omega\|}{2}\right)^2}{2!} + \frac{\left(-\left(\frac{\|\omega\|}{2}\right)^2\right)^2}{4!} + \frac{\left(-\left(\frac{\|\omega\|}{2}\right)^2\right)^3}{6!} + \ldots = \left[1 - \frac{\left(\frac{\|\omega\|}{2}\right)^2}{2!} + \frac{\left(\frac{\|\omega\|}{2}\right)^4}{4!} - \frac{\left(\frac{\|\omega\|}{2}\right)^6}{6!} + \ldots\right] \quad (21)$$

$$= \cos\frac{\|\omega\|}{2}$$

Substituting equations 20 and 21 into equation 19:

$$e^{\Omega} = \cos\frac{\|\omega\|}{2}I + \frac{2}{\|\omega\|}\sin\frac{\|\omega\|}{2}\Omega \equiv \Phi(t, t_0) \qquad (22)$$

and equation 15 reduces to the simple homogenous equation:

$$\lambda(t) = \Phi(t, t_0)\lambda(t_0) = \left(\cos\frac{\|\omega\|}{2}I + \frac{2}{\|\omega\|}\sin\frac{\|\omega\|}{2}\Omega\right)\lambda(t_0) \qquad (23)$$

Equation 23 is the general solution to equation 9. Moreover, the solution of equation 23 is in closed form and does not violate any of the mathematical properties of the quaternion space. Thus, the solution stays on the surface of the unit hypersphere and guarantees that quaternion normalization will always be preserved.

The solution of equation 23 represents a four-space vector with components (a,b,c,d). This integrator can be made recursive over a small time step $\Delta t$ by using the trapezoidal rule to integrate the angular rates:

$$\overline{\omega}_{k+1,k} \equiv \frac{\Delta t}{2}\sqrt{(p_k + p_{k+1})^2 + (q_k + q_{k+1})^2 + (r_k + r_{k+1})^2} \qquad (24)$$

and, $$\overline{R}_{k+1,k} = \frac{\Delta t}{2}[r(t_k) + r(t_{k+1})], \; \overline{Q}_{k+1,k} = \frac{\Delta t}{2}[q(t_k) + q(t_{k+1})], \qquad (25)$$

$$\overline{P}_{k+1,k} = \frac{\Delta t}{2}[q(t_k) + q(t_{k+1})]$$

gives the equation for the state transition matrix:

$$\Phi_{k+1,k} = \cos\frac{\|\overline{\omega}_{k+1,k}\|}{2}I + \frac{2}{\|\overline{\omega}_{k+1,k}\|}\sin\frac{\|\overline{\omega}_{k+1,k}\|}{2}\overline{\Omega}_{k+1,k} \qquad (26)$$

The state transition matrix module 520 receives the $\Omega$ matrix from the $\Omega$ matrix module and $\|\omega\|$ from the TIARM module. The module 520 then computes the state transition matrix $\Phi_{K+1,K}$ over a time step using equation 26. This results in recursive solution over a small time step that preserves the norm of the quaternion.

Note that the state transition matrix $\Phi_{K+1,K}$ of equation 26 contains only a single cosine and a single sine term. Thus, the computation of the state transition matrix is less computationally intensive and less time-consuming than numerical integration schemes of the prior art.

Once the state transition matrix $\Phi_{K+1,K}$ has been calculated by the state transition module 520, the quaternion update module 516 computes the updated quaternions using the equation:

$$[a,b,c,d]_{k+1} = \Phi_{K+1,K}[a,b,c,d]_k \qquad (26a)$$

Once the quaternion update module 516 has calculated the updated quaternions $[a,b,c,d]_{k+1}$ they are either sent to the quaternion kinematics equations module 504 or the reverse transformation logic 312. If requested by the quaternions kinematics equations module 504, the updated quaternions $[a,b,c,d]_{k+1}$ are used along with the angular velocity vector $(p,q,r)_{k+1}$ at the new time from the accelerometers 204 and gyroscopes 208 to calculate the updated four-dimensional quaternion kinematics equations. This loop continues as illustrated in FIG. 5 by the arrows.

If instead the updated quaternions are requested by the reverse transformation logic 312, the quaternion update module 516 sends the requested information. The updated quaternions are used by the reverse transformation logic 312 as described below. The integration loop continues as illustrated in FIG. 5.

It should be noted that the operations of the integration loop logic modules do not necessarily need to take place in the order shown in FIG. 5 and described above.

i. Proof that the State Transition Matrix is Norm Preserving

The transition matrix $\Phi_{K+1,K}$ of equation 26 preserves the norm of the quaternion vector. This can be shown by taking:

$$\lambda_{k+1}^T \lambda_{k+1} = \lambda_k^T [\Phi_{k+1,k}^T \Phi_{k+1,k}]\lambda_k \qquad (27)$$

$$= \lambda_k^T \left[\cos\frac{\|\overline{\omega}_{k+1,k}\|}{2}I + \right.$$

$$\frac{2}{\|\overline{\omega}_{k+1,k}\|}\lambda_k \sin\frac{\|\overline{\omega}_{k+1,k}\|}{2}\overline{\Omega}_{k+1,k}\right]^T \left[\cos\frac{\|\overline{\omega}_{k+1,k}\|}{2}I + \right.$$

$$\left.\frac{2}{\|\overline{\omega}_{k+1,k}\|}\sin\frac{\|\overline{\omega}_{k+1,k}\|}{2}\overline{\Omega}_{k+1,k}\right]\lambda_k$$

$$= \lambda_k^T \left[\cos\frac{\|\overline{\omega}_{k+1,k}\|}{2}I + \right.$$

$$\frac{2}{\|\overline{\omega}_{k+1,k}\|}\sin\frac{\|\overline{\omega}_{k+1,k}\|}{2}\cos\frac{\|\overline{\omega}_{k+1,k}\|}{2}[\overline{\Omega}_{k+1,k}^T + \overline{\Omega}_{k+1,k}]\right]\lambda_k +$$

$$\lambda_k^T \left[\left(\frac{2}{\|\overline{\omega}_{k+1,k}\|}\sin\left\|\overline{\omega}_{k+1,k}\frac{\|}{2}\right\|\right)^2 \overline{\Omega}_{k+1,k}^T \overline{\Omega}_{k+1,k}\right]\lambda_k$$

and since $\Omega$ is anti-symmetric:

$$\overline{\Omega}_{k+1,k}^T + \overline{\Omega}_{k+1,k} = 0, \text{ and } \overline{\Omega}_{k+1,k}^T \overline{\Omega}_{k+1,k} = \frac{\|\overline{\omega}_{k+1,k}\|^2}{4} \qquad (28)$$

Substituting equation 28 into equation 27 and collecting terms:

$$\lambda_{k+1}^T \lambda_{k+1} = \lambda_k^T \left[\cos^2\frac{\|\overline{\omega}_{k+1,k}\|}{2} + \right. \qquad (29)$$

$$\left.\left(\left[\frac{2}{\|\overline{\omega}_{k+1,k}\|}\sin\frac{\|\overline{\omega}_{k+1,k}\|}{2}\right]\right)^2 \frac{\|\overline{\omega}_{k+1,k}\|^2}{4}\right]\lambda_k$$

$$= \lambda_k^T \left[\cos^2\frac{\|\overline{\omega}_{k+1,k}\|}{2} + \sin^2\frac{\|\overline{\omega}_{k+1,k}\|}{2}\right]\lambda_k$$

$$= \lambda_k^T \lambda_k$$

Thus, regardless of the noise on the angular rates, the quaternion norm is preserved between integration time steps! Only the numerical errors involved in evaluating the sin and cos terms will cause the quaternions to be de-normalized. Therefore, the quaternions may need to be normalized after a substantial number of time steps in order to avoid roundoff error accumulation.

c. Reverse Transformation Logic

Figure 6:
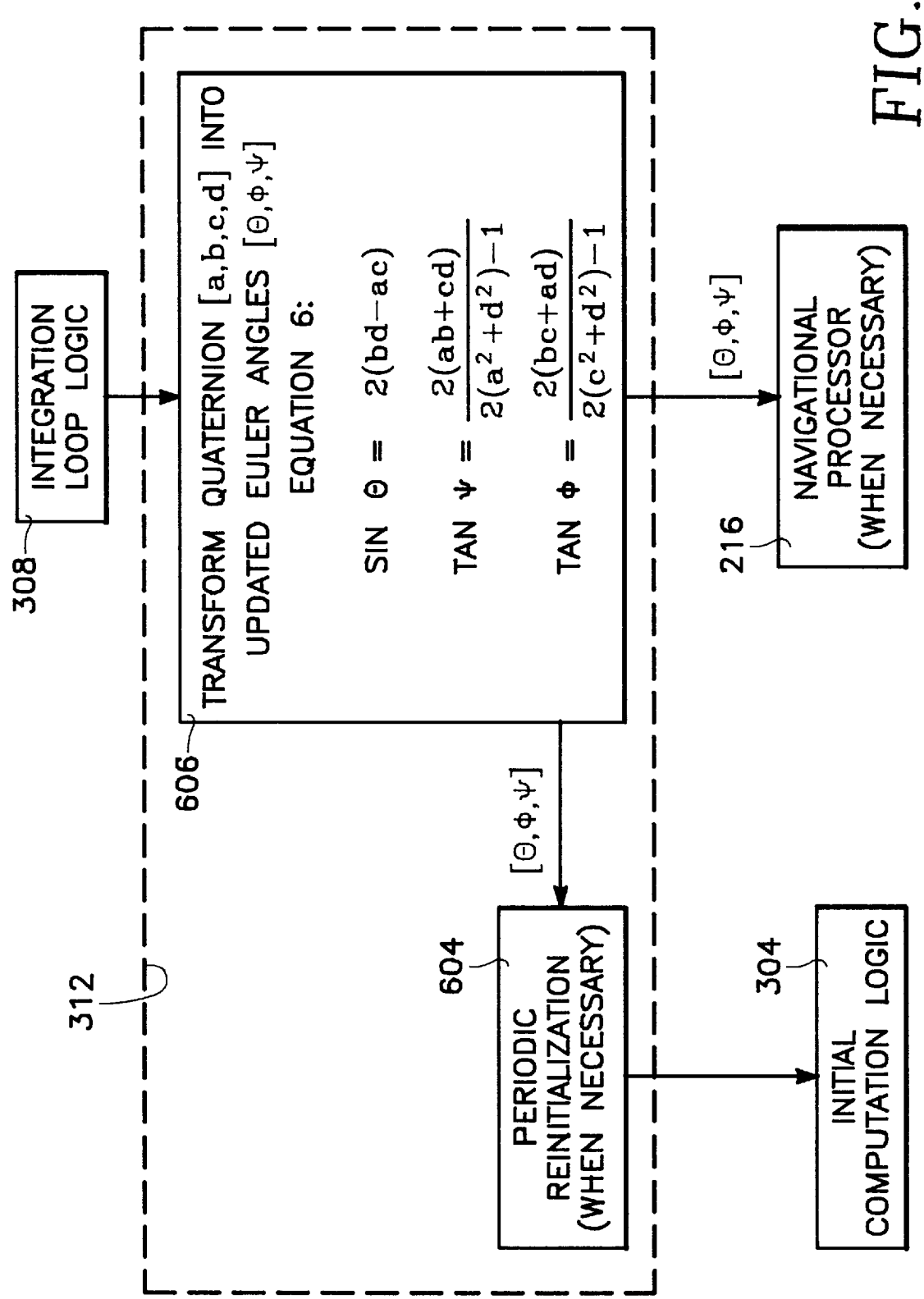
FIG. 6 is a detailed block diagram of the reverse transformation logic of the kinematics equations integrator of the present invention.

FIG. 6 is a detailed block diagram of the reverse transformation logic of the kinematics equations integrator of the present invention. The updated quaternion is received from the integration loop logic 308. This updated quaternion is then used by the reverse quaternion transform module 606 to transform the 4-D quaternion into attitude information in 3-D in the form of the Euler angles ( This reverse transformation is given by equation 6:

$$\sin\theta = -m_{13} = 2(bd - ac) \qquad (6)$$
$$\tan\psi = \frac{m_{12}}{m_{11}} = \frac{2(ab + cd)}{2(a^2 + d^2) - 1}$$
$$\tan\phi = \frac{m_{23}}{m_{33}} = \frac{2(bc + ad)}{2(c^2 + d^2) - 1}$$

The updated Euler angles are then sent to the navigational processor 216 for use in determining whether the vehicle 200 is at the desired location or at the preferred attitude. The navigational processor then instructs the control system 220 to make any needed corrections in the attitude of the vehicle 200 via the actuators 224 and control surfaces 228. Meanwhile, reverse transformation logic 312 returns to the integration loop logic 308 to continue the integration loop at a new time step.

The updated Euler angles also may be sent to the reinitialization module 604 for determination of whether the integration loop logic 308 needs to be reinitialized. The criteria for determining whether reinitialization is required is discussed above in the initial computation logic section. If reinitialization is required the updated Euler angles are sent to the initial computation logic. If reinitialization is not required then the reverse transformation logic 312 returns to the integration loop logic 308 to continue the integration loop at a new time step.

Functional Overview

The kinematics equations integrator method of the present invention is implemented in the integrator device 212 preferably as a dedicated logic circuit or a field programmable gate array (FPGA). Alternatively, as shown in FIG. 2, the integrator device 212 may contain a microprocessor 232 and memory 236 for storing software coded with the integrator method. The memory 236 may be a hard drive, CD-ROM, random access memory (RAM) or any other computer memory device capable of storing the software. This memory 236 stores data received from the INS, intermediate results, and the functions, steps and instructions of the software containing the integration method and the microprocessor 232 executes the program.

The integration method is capable interacting with the INS as part of the kinematics equations integrator device by receiving information from and supplying information to the INS. The INS then uses this information supplied by the kinematics equations integrator device and method to determine whether the vehicle is on course and to effect needed changes.

Similar to the integrator device described above, the kinematics equations integrator method of the present invention is divided into an initial computation function, an integration loop function and a reverse logic function.

1. Initial Computation Function

Figure 7:
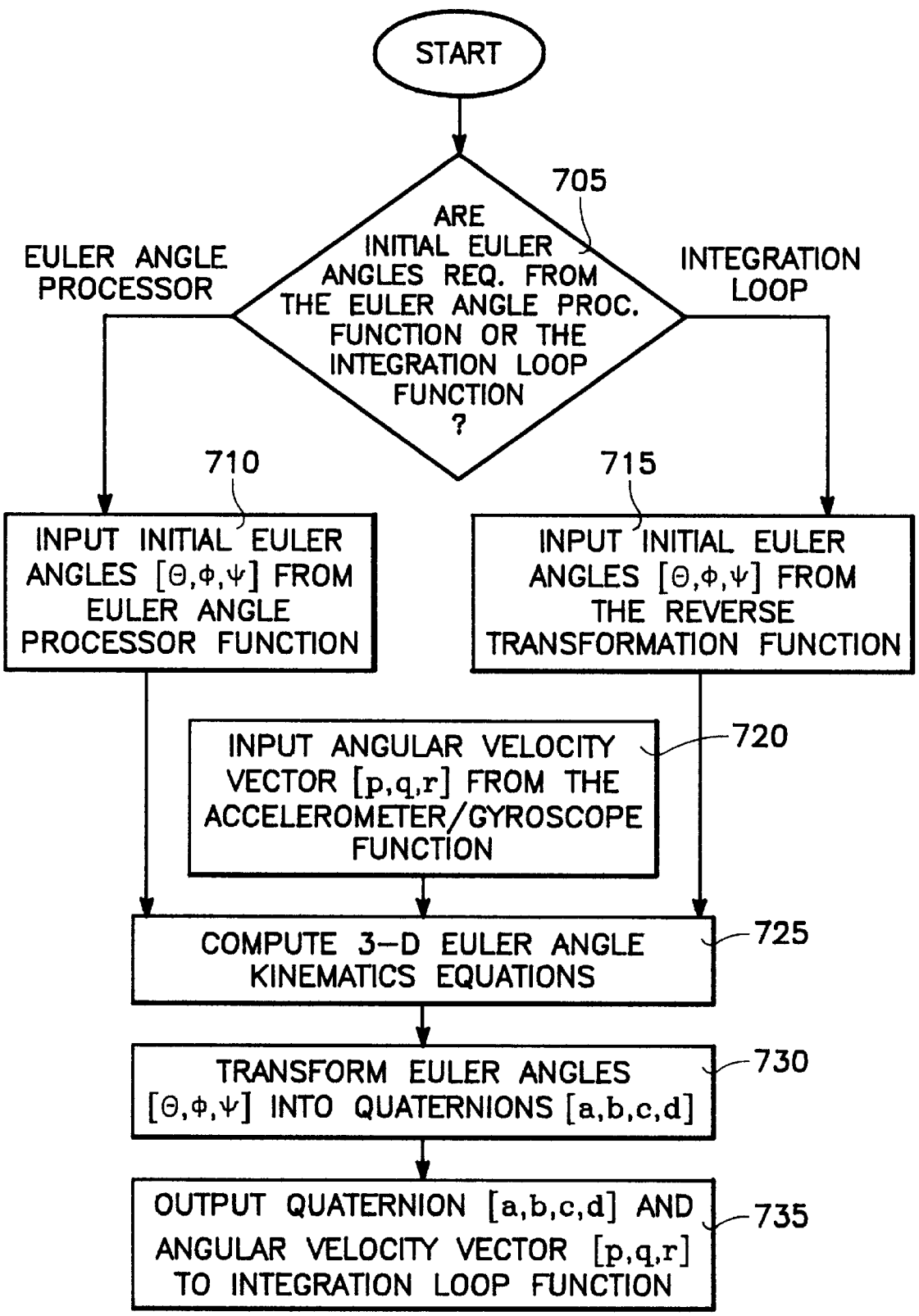
FIG. 7 is a detailed flow diagram of the operation of the initial computation function of the kinematics equations integrator of the present invention.

FIG. 7 is a detailed flow diagram of the operation of the initial computation function of the kinematics equations integrator of the present invention. The function starts by determining (block 705) whether the Euler angles are required from the Euler angle processor 210 (block 710) or the reverse transformation function (block 715). The criteria for which source to obtain the Euler angles is discussed above in connection with the initial computation logic.

Irrespective of where the Euler angles ($\theta$, $\Phi$, $\psi$) are obtained, the next step of the initial computation function is to obtain the angular velocity vector (p,q,r) from the accelerometers 204 and gyroscopes 208 (block 720). The 3-D Euler angle kinematics equations are then computed (block 725) using equation 3:

$$\begin{bmatrix} \dot\phi \\ \dot\theta \\ \dot\psi \end{bmatrix} = \frac{1}{\cos\theta} \begin{bmatrix} \cos\theta & (\sin\phi\sin\theta) & \cos\phi\sin\theta \\ 0 & \cos\phi\cos\theta & -\sin\phi\cos\theta \\ 0 & \sin\phi & \cos\phi \end{bmatrix} \begin{bmatrix} p \\ q \\ r \end{bmatrix} \qquad (3)$$

Next, the Euler angles ($\theta,\phi,\psi$) are transformed (block 730) into a quaternion vector (a,b,c,d) as given by equation 5:

$$\begin{bmatrix} a \\ b \\ c \\ d \end{bmatrix} = \begin{bmatrix} \frac{m_{23} - m_{32}}{4d} \\ \frac{m_{31} - m_{13}}{4a} \\ \frac{m_{12} - m_{21}}{4d} \\ \frac{1}{2}\sqrt{1 + m_{11} + m_{22} + m_{33}} \end{bmatrix} \qquad (5)$$

The initial computation function then sends the computed quaternion vector (a,b,c,d) and the angular velocity vector (p,q,r) to the integration loop function (block 735).

2. Integration Loop Function

Figure 8:
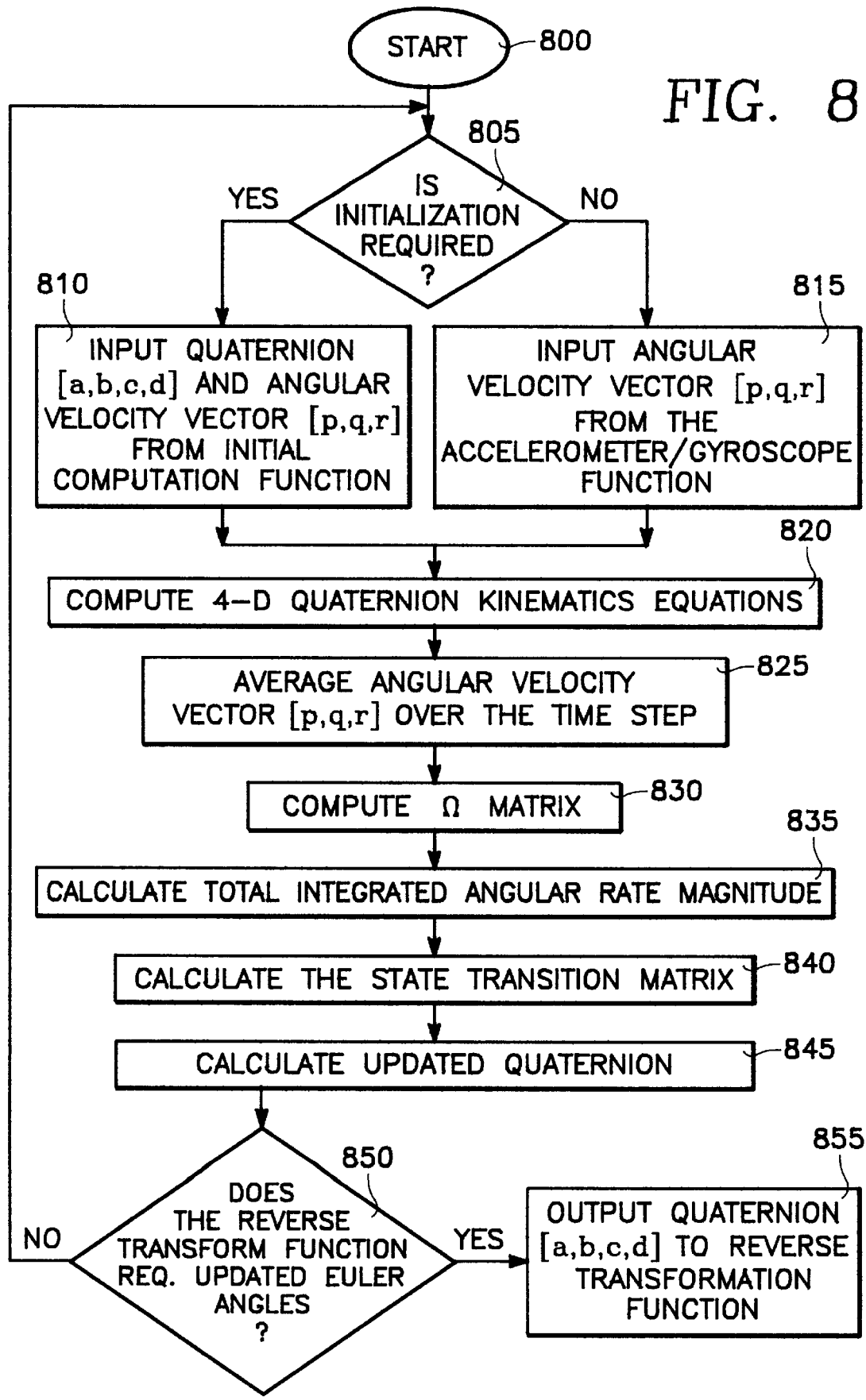
FIG. 8 is a detailed flow diagram of the operation of the integration loop function of the kinematics equations integrator of the present invention; and, FIG. 9 is a detailed flow diagram of the operation of the reverse transformation function of the kinematics equations integrator of the present invention.

FIG. 8 is a detailed flow diagram of the operation of the integration loop function of the kinematics equations integrator of the present invention. The function begins by determining whether initialization is required (block 805). The criteria for how to answer this question is discussed above in the description of the initial computation logic.

If initialization is required, the integration loop function receives the quaternion vector (a,b,c,d) and the angular velocity vector (p,q,r) from the initial computation function (block 810). On the other hand, if initialization is not required, the integration loop function receives only the angular velocity vector (p,q,r) from the accelerometers 204 and gyroscopes 208 (block 815). Also, the quaternion vector (a,b,c,d) is the updated quaternion vector calculated during the previous time step and obtained from the integration loop function.

The next step of the integration loop function is to calculate (block 820) the 4-D quaternion kinematics equations, given by equation 8:

$$\begin{bmatrix} \dot a \\ \dot b \\ \dot c \\ \dot d \end{bmatrix} = \frac{1}{2}\begin{bmatrix} 0 & r & -q & p \\ -r & 0 & p & q \\ q & -p & 0 & r \\ -p & -q & -r & 0 \end{bmatrix}\begin{bmatrix} a \\ b \\ c \\ d \end{bmatrix} = \qquad (8)$$

Next, the angular velocity vector (p,q,r) is averaged (block 825) over the time step $\Delta t$ to obtain the average angular velocity vector (P,Q,R), as defined by equation 14:

$$\frac{R}{2} \equiv \int_{t_0}^{t} \frac{r(t)dt}{2}, \frac{Q}{2} \equiv \int_{t_0}^{t} \frac{q(t)dt}{2}, \frac{P}{2} \equiv \int_{t_0}^{t} \frac{p(t)dt}{2} \qquad (14)$$

This step is optional, and the remainder of the operations of the integration loop function could proceed using the angular velocity vector (p,q,r) instead of the average angular velocity vector (P,Q,R).

The $\Omega$ matrix is then computed (block 830) using one of the angular velocity vectors. The $\Omega$ matrix is given by the integrand of equation 15:

$$\lambda(t) = \exp\left\{\int_{t_0}^{t}\begin{bmatrix} 0 & \frac{R}{2} & -\frac{Q}{2} & \frac{P}{2} \\ -\frac{R}{2} & 0 & \frac{P}{2} & \frac{Q}{2} \\ \frac{Q}{2} & -\frac{P}{2} & 0 & \frac{R}{2} \\ -\frac{P}{2} & -\frac{Q}{2} & -\frac{R}{2} & 0 \end{bmatrix} dt\right\}\lambda(t_0) \quad (15)$$

$$\equiv \exp[\Omega(p, q, r)]\lambda(t_0)$$

The integration loop function then computes $\|\omega\|$, defined as the total integrated angular rate magnitude (TIARM) (block 835). The TIARM is calculated from equation 18:

$$\|\omega\|^2 = P^2 + Q^2 + R^2 \quad (18)$$

Both the results from the calculations of the $\Omega$ matrix and the TIARM are used in the next step of computing the state transition matrix $\Phi_{k+1,k}$ over a time step $\Delta t$ (block 840). The computation of the state transition matrix $\Phi_{k+1,k}$ is given by equation 26:

$$\Phi_{k+1,k} = \cos\frac{\|\overline{\omega}_{k+1,k}\|}{2}I + \frac{2}{\|\overline{\omega}_{k+1,k}\|}\sin\frac{\|\overline{\omega}_{k+1,k}\|}{2}\Omega_{k+1,k} \quad (26)$$

This recursive solution over $\Delta t$ produces a solution to the kinematics equations that preserves the norm of the quaternion. The proof the state transition matrix is norm-preserving is detailed above.

After the state transition matrix has been computed, the updated quaternions are calculated (block 845) using equation 26a:

$$[a,b,c,d]_{k+1} = \Phi_{K+1,K}[a,b,c,d]_k \quad (26a)$$

The integration loop function then determines where to send the updated quaternion. If requested by the reverse transformation function the updated quaternion is sent there (block 835). Otherwise, the updated quaternion is sent back to start (block 800) to begin a new time step of the integration loop function, and the steps are repeated.

It should be noted that the operations of the integration loop function do not necessarily need to take place in the order shown in FIG. 8 and described above.

3. Reverse Transformation Function

Figure 9:
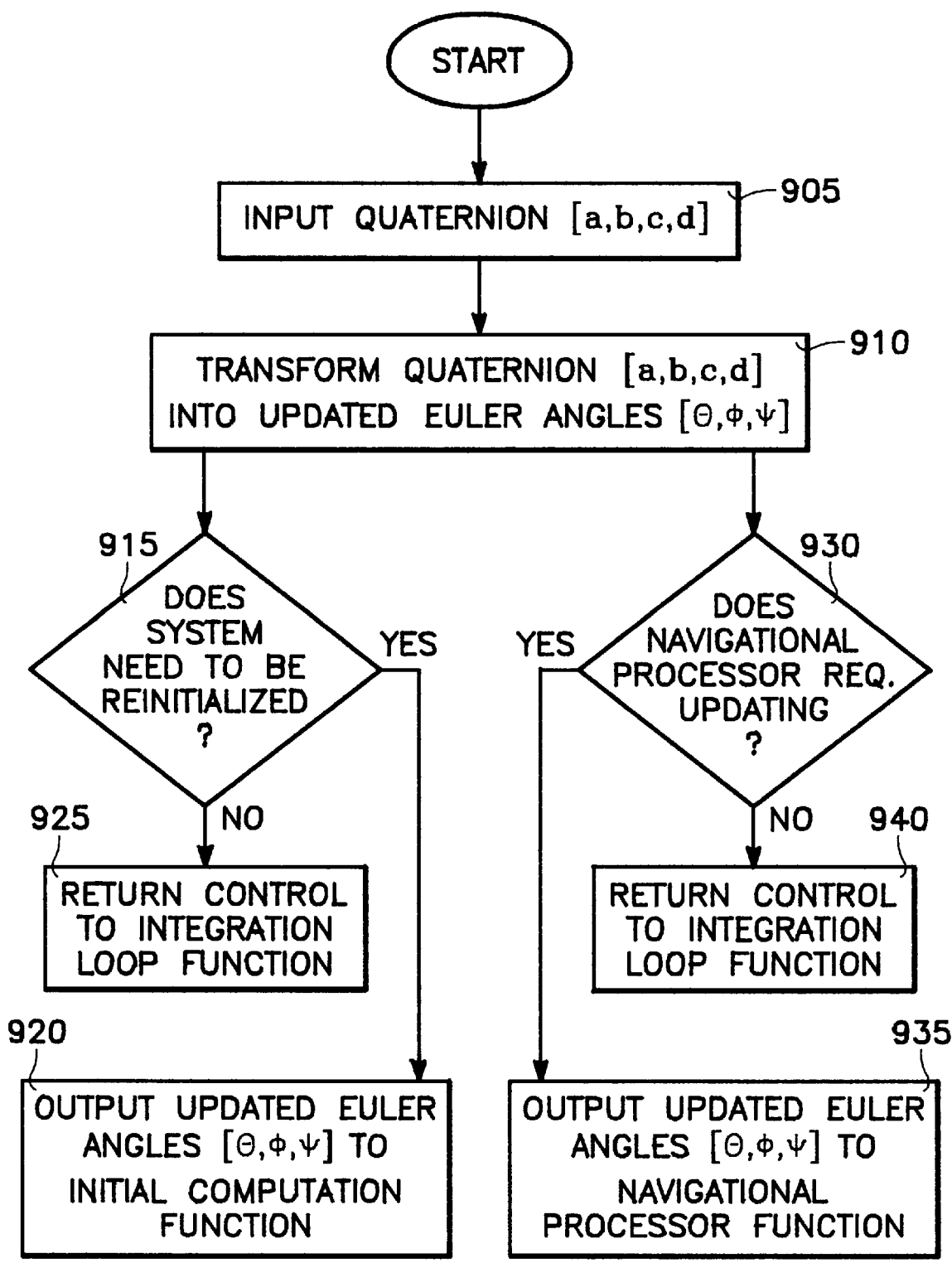

FIG. 9 is a detailed flow diagram of the operation of the reverse transformation function of the kinematics equations integrator of the present invention. The function receives (block 905) the updated quaternion from the integration loop function and then transforms (block 910) the quaternion (a,b,c,d) into updated Euler angles ($\theta,\Phi,\psi$), using equation 6:

$$\sin\theta = -m_{13} = 2(bd - ac) \quad (6)$$

$$\tan\psi = \frac{m_{12}}{m_{11}} = \frac{2(ab + cd)}{2(a^2 + d^2) - 1}$$

$$\tan\phi = \frac{m_{23}}{m_{33}} = \frac{2(bc + ad)}{2(c^2 + d^2) - 1}$$

The reverse transformation function then determines (block 915) whether the integration loop function require reinitialization, as discussed in the initial computation logic section. If reinitialization is required, the reverse transformation function sends the updated Euler angles to the initial computation function (block 920). If reinitialization is not required, the reverse transformation function returns to the integration loop function for another integration loop at a new time step (block 925).

Meanwhile, the reverse transformation function determine (block 930) whether the navigational processor 216 requires updating. If updating is required, the reverse transformation function sends the updated Euler angles to the navigational processor 216 (block 930). Otherwise, the reverse transformation function returns to the integration loop function (block 940).

The kinematics equations integrator device and method of the present invention computes a closed-form solution to the kinematics equations to obtain the attitude of the vehicle, and does so with increased speed, increased accuracy and less cost than prior art integration methods. Moreover, the norm of the quaternion is preserved, alleviating the need to renormalize the quaternion after each time step and the need for correction terms. Consequently, the computational system needed for the present invention is usually less than that needed for prior art integration methods. Moreover, the source code needed to implement the method of the present invention can be less complex and shorter than those needed for prior art methods.

The foregoing description of the preferred embodiment of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims appended hereto.

What is claimed is:

1. In a vehicle such as a flight vehicle, a control system comprising:

acceleration sensors with a angular velocity processor for providing 3-D angular velocities;

a navigation computer for computing trajectory corrections from attitude angles of said vehicle;

a kinematics equations integrator for updating a set of vehicle attitude angles of a vehicle using said 3-dimensional angular velocities of said vehicle, said integrator being connected to said navigation computer and to said angular velocity processor and comprising:

an integrating factor module which computes an integrating factor matrix from quantities corresponding to said 3-dimensional angular velocities;

a total integrated angular rate module which computes a total integrated angular rate from said quantities corresponding to 3-dimensional angular velocities;

a state transition matrix module, connected to said integrating factor module and said total integrated angular rate module, which computes a state transition matrix as a sum of (a) a first complementary function of said total integrated angular rate and (b) said integrating factor matrix multiplied by a second complementary function of said total integrated angular rate; and an updating module which updates said set of vehicle attitude angles using said state transition matrix for output to said navigation computer.

2. The apparatus of claim 1 wherein said integrator further comprises:

a quaternion module which computes a quaternion vector from said quantities corresponding to said 3-dimensional angular velocities; and wherein said updating module comprises:

(a) a matrix multiplier which updates said quaternion vector by multiplying said quaternion vector by said state transition matrix to produce an updated quaternion vector;

(b) a reverse transformation module which computes an updated set of vehicle attitude angles from said updated quaternion vector.

3. A method of integrating kinematics equations for updating a set of vehicle attitude angles of a vehicle using 3-dimensional angular velocities of said vehicle, comprising:

computing an integrating factor matrix from quantities corresponding to said 3-dimensional angular velocities;

computing a total integrated angular rate from said quantities corresponding to 3-dimensional angular velocities;

computing a state transition matrix as a sum of (a) a first complementary function of said total integrated angular rate and (b) said integrating factor matrix multiplied by a second complementary function of said total integrated angular rate; and updating said set of vehicle attitude angles using said state transition matrix.

4. A computer-readable medium storing computer executable instructions for performing the steps recited in claim 1.

5. The method of claim 1 wherein said quantities corresponding to said 3-dimensional angular velocities comprise respective averages of said 3-dimensional angular velocities over plural time frames.

6. The method of claim 1 further comprising:

computing a quaternion vector from said quantities corresponding to said 3-dimensional angular velocities; and wherein the updating of said set of vehicle attitude angles using said state transition matrix comprises:

(a) updating said quaternion vector by multiplying said quaternion vector by said state transition matrix to produce an updated quaternion vector;

(b) computing an updated set of vehicle attitude angles from said updated quaternion vector.

7. The method of claim 6 wherein the updating of said quaternion vector preserves the norm of said vector, whereby said updated set of vehicle attitude angles are virtually error-free.

8. The method of claim 1 wherein said first and second trigonometric functions are complementary.

9. The method of claim 8 wherein said first and second trigonometric functions comprise a sine and a cosine, respectively.

10. Apparatus for use in integrating kinematics equations for updating a set of vehicle attitude angles of a vehicle using 3-dimensional angular velocities of said vehicle, said apparatus comprising:

a processor;

a memory having executable instructions stored therein; and wherein said processor, in response to said instructions stored in said memory:

computes an integrating factor matrix from quantities corresponding to said 3-dimensional angular velocities;

computes a total integrated angular rate from said quantities corresponding to 3-dimensional angular velocities;

computes a state transition matrix as a sum of (a) a first trigonometric function of said total integrated angular rate and (b) said integrating factor matrix multiplied by a second trigonometric function of said total integrated angular rate; and updates said set of vehicle attitude angles using said state transition matrix.

11. The apparatus of claim 10 wherein said quantities corresponding to said 3-dimensional angular velocities comprise respective averages of said 3-dimensional angular velocities over plural time frames.

12. The apparatus of claim 10 wherein said processor further:

computes a quaternion vector from said quantities corresponding to said 3-dimensional angular velocities; and wherein the updating of said set of vehicle attitude angles using said state transition matrix comprises:

(a) updating said quaternion vector by multiplying said quaternion vector by said state transition matrix to produce an updated quaternion vector;

(b) computing an updated set of vehicle attitude angles from said updated quaternion vector.

13. The apparatus of claim 12 wherein said first and second trigonometric functions are complementary.

14. The apparatus of claim 12 wherein said first and second trigonometric functions comprise a sine and a cosine, respectively.

15. The apparatus of claim 12 wherein the updating of said quaternion vector preserves the norm of said vector, whereby said updated set of vehicle attitude angles are virtually error-free.

16. A kinematics equations integrator for updating a set of vehicle attitude angles of a vehicle using 3-dimensional angular velocities of said vehicle, comprising:

an integrating factor module which computes an integrating factor matrix from quantities corresponding to said 3-dimensional angular velocities;

a total integrated angular rate module which computes a total integrated angular rate from said quantities corresponding to 3-dimensional angular velocities;

a state transition matrix module, connected to said integrating factor module and said total integrated angular rate module, which computes a state transition matrix as a sum of (a) a first complementary function of said total integrated angular rate and (b) said integrating factor matrix multiplied by a second complementary function of said total integrated angular rate; and an updating module which updates said set of vehicle attitude angles using said state transition matrix.

17. The apparatus of claim 16 wherein said quantities corresponding to said 3-dimensional angular velocities comprise respective averages of said 3-dimensional angular velocities over plural time frames.

18. The apparatus of claim 16 further comprising:

a quaternion module which computes a quaternion vector from said quantities corresponding to said 3-dimensional angular velocities; and wherein said updating module comprises:

(a) a matrix multiplier which updates said quaternion vector by multiplying said quaternion vector by said state transition matrix to produce an updated quaternion vector;

(b) a reverse transformation module which computes an updated set of vehicle attitude angles from said updated quaternion vector.

19. The apparatus of claim 18 wherein said updating module which updates said quaternion vector preserves the norm of said vector, whereby said updated set of vehicle attitude angles are virtually error-free.

20. The apparatus of claim 16 wherein said first and second trigonometric functions are complementary.

21. The apparatus of claim 20 wherein said first and second trigonometric functions comprise a sine and a cosine, respectively.

* * * * *